(12) United States Patent
Mizoguchi et al.

(10) Patent No.: US 8,553,303 B2
(45) Date of Patent: Oct. 8, 2013

(54) OPTICAL SCANNER AND IMAGE FORMING APPARATUS

(75) Inventors: Yasushi Mizoguchi, Suwa (JP); Yukio Miyamoto, Suwa (JP)

(73) Assignee: Seiko Epson Corporation (JP)

( * ) Notice: Subject to any disclaimer, the term of this patent is extended or adjusted under 35 U.S.C. 154(b) by 26 days.

(21) Appl. No.: 13/192,767

(22) Filed: Jul. 28, 2011

(65) Prior Publication Data
US 2012/0033280 A1 Feb. 9, 2012

(30) Foreign Application Priority Data

Aug. 5, 2010 (JP) .................................. 2010-176004

(51) Int. Cl.
*G02B 26/10* (2006.01)

(52) U.S. Cl.
USPC ...................... 359/199.3; 359/224.1; 359/904

(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | | |
|---|---|---|---|---|
| 5,583,688 A | * | 12/1996 | Hornbeck | 359/291 |
| 6,480,320 B2 | * | 11/2002 | Nasiri | 359/291 |
| 6,891,655 B2 | * | 5/2005 | Grebinski et al. | 359/291 |
| 7,022,249 B2 | * | 4/2006 | Valette | 216/24 |
| 7,391,553 B2 | * | 6/2008 | Orcutt | 359/291 |
| 7,404,909 B2 | * | 7/2008 | Rothenbury | 216/31 |
| 7,428,353 B1 | * | 9/2008 | Milanovic et al. | 385/18 |
| 2009/0231673 A1 | * | 9/2009 | Oden et al. | 359/291 |

FOREIGN PATENT DOCUMENTS

| JP | 2005-181395 | | 7/2005 |
|---|---|---|---|
| JP | 2011180462 A | * | 9/2011 |

\* cited by examiner

*Primary Examiner* — Jennifer L. Doak
*Assistant Examiner* — James McGee
(74) *Attorney, Agent, or Firm* — Harness, Dickey & Pierce, P.L.C.

(57) ABSTRACT

An optical scanner includes: a light reflecting section having a light reflecting surface; a supporting section supporting the light reflecting section; a movable section supporting the supporting section; at least a pair of movable beams extending from the movable section and disposed in such a way that the movable beams face each other; a displacement section connected to the movable beam; two drive beams each extending from the displacement section; and a supporting frame supporting the drive beams, wherein the movable beams each include a bending section which is bent and deformed in a thickness direction of the supporting frame, and an end on the side of the movable section of the supporting section is fixed in a position more distant from the light reflecting section than an end face on the side of the light reflecting section of the movable section.

7 Claims, 6 Drawing Sheets

OPTICAL SCANNER AND IMAGE FORMING APPARATUS

BACKGROUND

1. Technical Field

The present invention relates to optical scanners and image forming apparatuses.

2. Related Art

For example, as an optical scanner for performing drawing by optical scanning in a laser printer or the like, an optical scanner which is formed of a torsion oscillator and uses an actuator has been known (see, for example, JP-A-2005-181395 (Patent Document 1)).

In Patent Document 1, an actuator having an insulating substrate in which a pair of permanent magnets is provided and a scanner main body supported by the insulating substrate so as to be located between the pair of permanent magnets is disclosed. Moreover, the scanner main body has a frame-shaped supporting section, a frame-shaped outside movable plate provided inside the supporting section, and an inside movable plate (mirror) provided inside the outside movable plate. Furthermore, the outside movable plate is connected to a supporting section via a pair of first torsion bars extending in an X-axis direction, and the inside movable plate is connected to the outside movable plate via a second torsion bar extending in a Y-axis direction perpendicular to the X-axis direction. Moreover, the outside movable plate and the inside movable plate each have a coil.

In the actuator structured as described above, by the action of the magnetic fields generated from the coils and the magnetic field generated between the pair of permanent magnets by energization, the outside movable plate turns with the inside movable plate about an X axis using the first torsion bar as a central axis, and the inside movable plate turns about a Y axis by using the second torsion bar as a central axis.

As described above, in the actuator of Patent Document 1, the mechanism which turns the inside movable plate about the X axis and the mechanism which turns the inside movable plate about the Y axis differ from each other. This makes it impossible to turn the inside movable plate about the X axis and the Y axis under the same conditions. In addition, in the actuator of Patent Document 1, the magnetic field generated from the coil provided in the outside movable plate and the magnetic field generated from the coil provided in the inside movable plate interfere with each other, making it impossible to turn the inside movable plate about the X axis and the Y axis independently. Thus, the actuator of Patent Document 1 has a problem that it is impossible to turn the inside movable plate about the X axis and the Y axis with stability.

SUMMARY

An advantage of some aspects of the invention is to provide an optical scanner and an image forming apparatus which can turn a movable plate about two axes which are at right angles to each other with stability and realize an accurate image by preventing deviation of the movable plate and the axes about which the movable plate is turned.

APPLICATION EXAMPLE 1

An optical scanner according to this application example includes a light reflecting section having a light reflecting surface, a supporting section supporting the light reflecting section, a movable section that supports the supporting section and can turn about a rotation center axis, at least a pair of movable beams extending from the movable section and disposed in such a way that the movable beams face each other with the movable section interposed therebetwewen, a displacement section connected to the movable beam on the side opposite from the movable section, a driving section driving the displacement section, two drive beams each extending from the displacement section in a direction along the light reflecting surface and perpendicular to a direction in which the movable beam extends, and a supporting frame supporting the drive beams, the movable beams each include a bending section which is bent and deformed in a thickness direction of the supporting frame by displacement of the displacement section, and an end on the side of the movable section of the supporting section is fixed in a position more distant from the light reflecting section than an end face on the side of the light reflecting section of the movable section.

According to the application example described above, since an end of the supporting section of the light reflecting section is fixed in a position more distant from the light reflecting section than an end face on the side of the light reflecting section of the movable section, it is possible to fix the light reflecting section in a position closer to the center of rotation of the movable section and thereby obtain an optical scanner in which the shaft deviatesless from the appropriate position. Moreover, even if there is an excess of adhesive which fixes the movable section and the supporting section, it is possible to prevent the excess adhesive from leaking into a movable beam portion and from adhering to the surface on the side of the movable section of the light reflecting section. This makes it possible to prevent a loss of balance of the movable section and a movable shaft.

APPLICATION EXAMPLE 2

In the application example described above, the displacement section includes a permanent magnet having, along a direction perpendicular to the light reflecting surface, a north pole disposed on a side where one surface of the displacement section is located and a south pole disposed on a side where the other surface of the displacement section is located, and the driving section includes a coil disposed so as to generate a magnetic field in a direction perpendicular to the polarity of the permanent magnet.

According to the application example described above, it is possible to provide a driving device with a simple structure and obtain great driving force by electromagnetic driving.

APPLICATION EXAMPLE 3

In the application example described above, the supporting section is fixed to a bottom face portion of a concave section by being bonded thereto, the concave section provided in the movable section, and the area of the bottom face portion of the concave section is greater than the area of an opening of the concave section.

According to the application example described above, even when an excessive amount of adhesive for fixing the movable section and the supporting section by bonding them together is used, it is possible to retain the adhesive in the space formed by the concave section and the supporting section and thereby prevent the adhesive from leaking out onto an end face of the movable section. Furthermore, an excess part of the adhesive retained in the space is hardened and functions as an anchor by the concave section having a so-called inverse tapered portion, whereby it is possible to greatly improve the fixing strength of the supporting member to the movable section.

APPLICATION EXAMPLE 4

In the application example described above, an area of a bonded section in which the supporting section is bonded to the light reflecting section is smaller than an area of a bonded section in which the supporting section is bonded to the movable section.

According to the application example described above, by forming the supporting section into an inverse tapered shape, the anchor effect of the leaking adhesive after hardening is increased, whereby it is possible to improve the fixing strength of the supporting section to the movable section.

APPLICATION EXAMPLE 5

In the application example described above, a space formed by a concave section and the supporting section is filled with an adhesive, the concave section provided in the movable section, and an end of the adhesive on the side of the opening of the concave section is located in the space.

According to the application example described above, by filling the space with the adhesive, the area of a bonding portion is increased and the hardened adhesive functions as an anchor. This makes it possible to further improve the fixing strength of the supporting section to the movable section.

APPLICATION EXAMPLE 6

An image forming apparatus according to this application example includes a light source and an optical scanner scanning a light from the light source, the optical scanner includes a light reflecting section having a light reflecting surface, a supporting section supporting the light reflecting section, a movable section that supports the supporting section and can turn about a rotation center axis, at least a pair of movable beams extending from the movable section and disposed in such a way that the movable beams face each other with the movable section interposed therebetween, a displacement section connected to the movable beam on the side opposite from the movable section, a driving section driving the displacement section, two drive beams each extending from the displacement section in a direction along the light reflecting surface and perpendicular to a direction in which the movable beam extends, and a supporting frame supporting the drive beams, the movable beams each include a bending section which is bent and deformed in a thickness direction of the supporting frame by displacement of the displacement section, and an end on the side of the movable section of the supporting section is fixed in a position more distant from the light reflecting section than an end face on the side of the light reflecting section of the movable section.

According to the image forming apparatus of this application example, it is possible to perform turning of the movable section about one of two axes which are at right angles to each other and turning of the movable section about the other axis independently. This makes it possible to turn the movable section about two axes which are at right angles to each other with stability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

First Embodiment

Figure 1A:
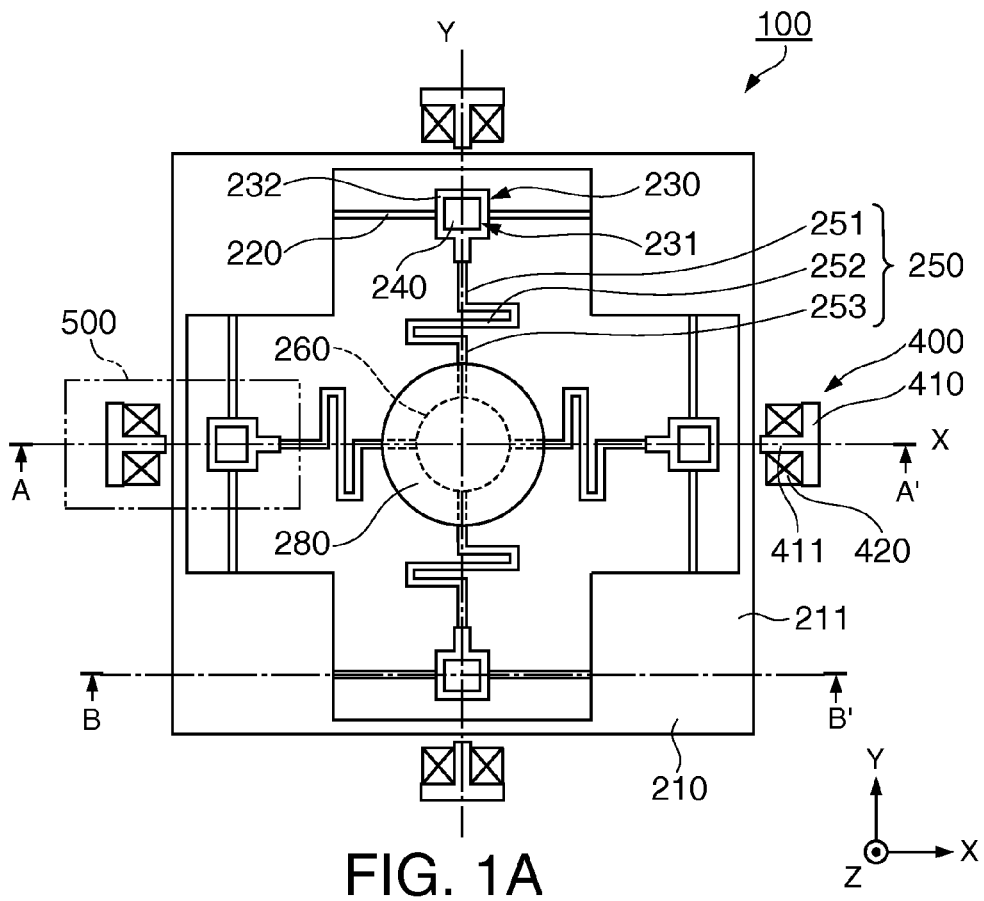
FIGS. 1A to 1C show the outline of an optical scanner according to a first embodiment, FIG. 1A being a plan view, FIG. 1B being a sectional view taken on the line A-A' of FIG. 1A, and FIG. 1C being a sectional view taken on the line B-B' of FIG. 1A.
Figure 1B:
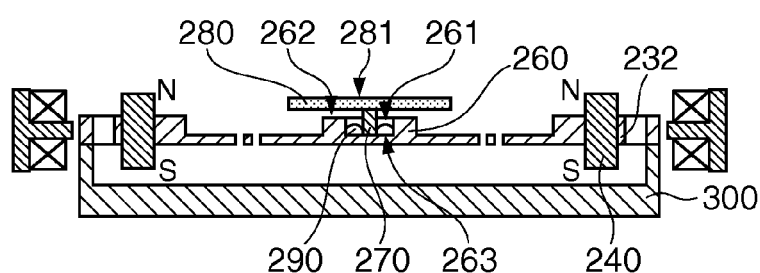
Figure 1C:
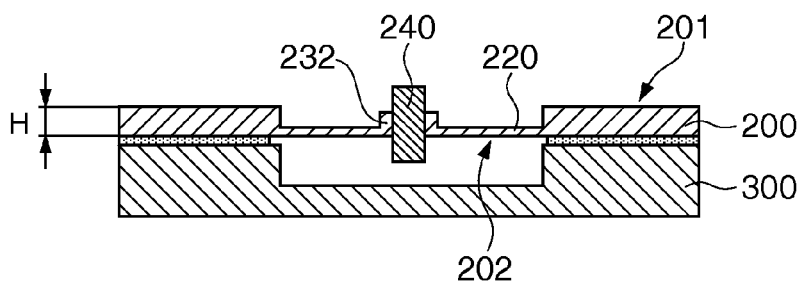

FIGS. 1A to 1C show an optical scanner of a first embodiment, FIG. 1A is a plan view, FIG. 1B is a sectional view taken on the line A-A' of FIG. 1A, and FIG. 1C is a sectional view taken on the line B-B' of FIG. 1A. As shown in FIG. 1C, an optical scanner 100 shown in FIG. 1A includes a vibrating substrate 200, a pedestal 300, and driving sections 400 relatively fixed, by unillustrated means, to the vibrating substrate 200 fixed to the pedestal 300.

The vibrating substrate 200 includes, in the outer periphery thereof, a supporting frame 210 formed into a frame having a substantially rectangular shape. At the four corners of the supporting frame 210, fixed sections 211 fixed to the pedestal 300 by means of bonding are provided. Moreover, from each fixed section 211, drive beams 220 extend in parallel to illustrated X- and Y-axis directions and each connect to a corresponding one of displacement sections 230 provided in portions in which the directions in which the drive beams 220 extend and the X- and Y-axis direction intersect.

The displacement section 230 has a frame-shaped magnet holding section 232 with a through-hole 231 at the center thereof, and to the magnet holding section 232, a permanent magnet 240 is fixed, for example, by being press-fitted thereinto, by using an adhesive, or by being press-fitted thereinto and by using an adhesive. The permanent magnet 240 is disposed in such a way that the polarity on the side of one surface 201 of the vibrating substrate 200 is different from that on the side of the other surface 202 of the vibrating substrate 200. For example, a bar magnet is illustrated as an example of the permanent magnet 240 shown in FIGS. 1A to 1C, and the permanent magnet 240 is fixed in such a way that a north pole, for example, of the permanent magnet 240 is disposed on the side of one surface 201 of the vibrating substrate 200 and a south pole is disposed on the side of the other surface 202 of the vibrating substrate 200.

Furthermore, from the displacement section 230, a movable beam 250 including a displacement section's-side movable beam 251, a bending section 252, and a movable section's-side movable beam 253 extends toward the center of the vibrating substrate 200 and connects to a movable section 260 provided in the center of the vibrating substrate 200. The movable beam 250 bends by displacement of the displacement section 230 which is driven by a driving method which will be described later, and is formed so as to be thinner than a substrate thickness H of the vibrating substrate 200 as shown in FIG. 1C for facilitating the deformation of the bending section 252 in order to oscillate the movable section 260 to which the movable beam 250 connects.

As shown in FIG. 1B, a concave section 261 is formed at the center of the movable section 260, and a supporting member 270 having one end fixed to a light reflecting member 280 is fixed, at the other end thereof, to a bottom face 263 of the concave section 261 by being bonded thereto with an adhesive 290. That is, the light reflecting member 280 is fixed to the movable section 260 via the supporting member 270.

A surface 281 of the light reflecting member 280 opposite to the side of the light reflecting member 280 to which the supporting member 270 is fixed is formed as a light reflecting surface 281 which is flat and has light reflectivity. The light reflecting surface 281 is formed as a surface having light reflectivity by, for example, forming a metal film such as gold, silver, or aluminum on a surface by vacuum deposition or the like.

As described earlier, the vibrating substrate 200 has formed therein a pair of drive beams 220, a pair of displacement sections 230, and a pair of movable beams 250 each including the bending section 252 on both the X axis and the Y axis in such a way that the drive beam 220, the displacement section 230, and the movable beam 250 of one pair on each axis faces their counterparts of the other pair on the same axis with the movable section 260 interposed therebetween. By disposing the drive beams 220, the displacement sections 230, and the movable beams 250 each including the bending section 252 in this way, it is possible to oscillate the movable section 260 three-dimensionally.

The driving sections 400 are disposed on the outside of the vibrating substrate 200 in such a way that the driving sections 400 each face a corresponding one of the displacement sections 230, and the positions thereof are fixed with respect to the vibrating substrate 200 by unillustrated means of fixing. Each driving section 400 is formed of a coil fixing section 410 and a coil 420, and the coil fixing section 410 holds the coil 420 and is fixed to the unillustrated means of fixing to fix the driving section 400 (hereinafter referred to as the coil section 400).

The coil section 400 is disposed near the displacement section 230 so as to face the permanent magnet 240, and is electrically connected to an unillustrated power supply to make the coil 420 generate a magnetic field which acts on the permanent magnet 240. The coils 420 are formed and disposed such that the coil 420 of the coil section 400 disposed on the X axis generates a magnetic field in the X-axis direction and the coil 420 of the coil section 400 disposed on the Y axis generates a magnetic field in the Y-axis direction.

The coil fixing section 410 of the coil section 400 disposed on the X axis includes a projection 411 projecting in the X-axis direction toward the center of the vibrating substrate 200, and the coil fixing section 410 of the coil section 400 disposed on the Y axis includes a projection 411 projecting in the Y-axis direction toward the center of the vibrating substrate 200. The coil 420 is formed as a winding with the projection 411 as a core thereof. Therefore, by forming the coil fixing section 410 by using a soft magnetic material such as iron, permalloy, or an amorphous magnetic alloy, it is possible to use the coil fixing section 410 as a magnetic core of the coil 420 and generate a magnetic field more efficiently.

The displacement section 230 including the permanent magnet 240 described above, the drive beam 220 connecting the displacement section 230 to the supporting frame 210, and the coil section 400 form a driving device 500.

Figure 2A:
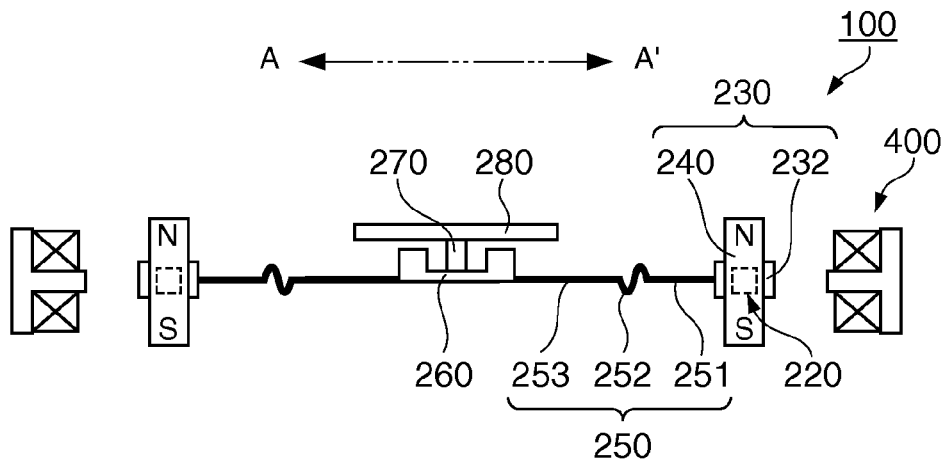
FIGS. 2A to 2C are conceptual diagrams explaining a method for driving the optical scanner according to the first embodiment.
Figure 2B:
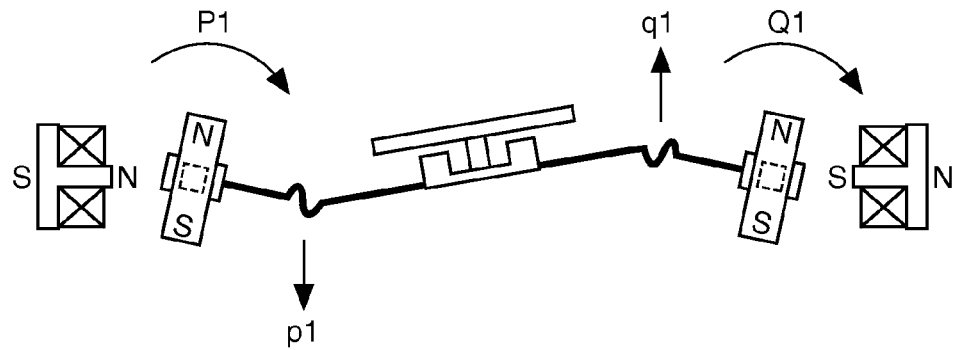
Figure 2C:
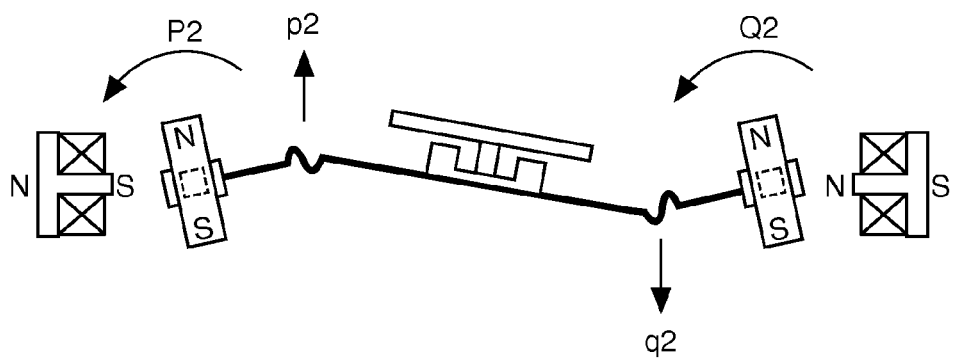

The operation of the optical scanner 100 described above, in particular, the operation of the driving device 500, the movable beam 250, the movable section 260, and the light reflecting member 280 fixed to the movable section 260 will be described. FIGS. 2A to 2C are diagrams schematically explaining the operation of the portion of the optical scanner 100 indicated by the line A-A' (the X axis) shown in FIG. 1A.

FIG. 2A is a diagram showing a state in which the optical scanner 100 does not operate. As the permanent magnet 240 provided in the displacement section 230, a bar magnet is used. The permanent magnet 240 is inserted into the through-hole 231 of the magnet holding section 232 in such a way that the upper side shown in the drawing becomes a north pole and the lower side becomes a south pole, and is fixed by using an adhesive, by being press-fitted, or by being press-fitted and using an adhesive.

Through the coil 420 provided in the coil section 400 and electrically connected to an unillustrated power supply, as shown in FIG. 2B, the coil section 400 in an A direction passes a current by which a side facing the displacement section 230 becomes a north pole and a side facing opposite from the displacement section 230 becomes a south pole. On the other hand, the coil section 400 on the A' side passes a current so that a side facing the displacement section 230 becomes a south pole and a side facing opposite from the displacement section 230 becomes a north pole. As described above, when a magnetic field is generated in the coil section 400, a force acts in such a way that the pole of the permanent magnet 240 whose polarity is the same as the polarity of the side of the coil section 400 which the pole faces moves away from the coil section 400 and the pole of the permanent magnet 240 whose polarity is different from the polarity of the coil section 400 which the pole faces moves closer to the coil section 400. As a result, the displacement section 230 on the A side rotates about the drive beam 220 and is displaced in a P1 direction shown in the drawing, and the displacement section 230 on the A' side rotates about the drive beam 220 and is displaced in a Q1 direction. As a result of this rotational displacement of the displacement sections 230, the displacement section's-side movable beams 251 connected to the displacement sections 230 also rotate in the P1 and Q1 directions.

As a result of this rotational displacement, one bending section 252 moves in a p1 direction which is the moving direction of the end of the displacement section's-side movable beam 251 on the A side rotating in the P1 direction, and the other bending section 252 moves in a q1 direction which is the moving direction of the end of the displacement section's-side movable beam 251 on the A' side rotating in the Q1 direction. At this time, the displacement of the movable beam 250 mainly causes deformation of the bending section 252, and does not cause deformation such as distortion or torsion in the displacement section's-side movable beam 251 and the movable section's-side movable beam 253.

Figure 3A:
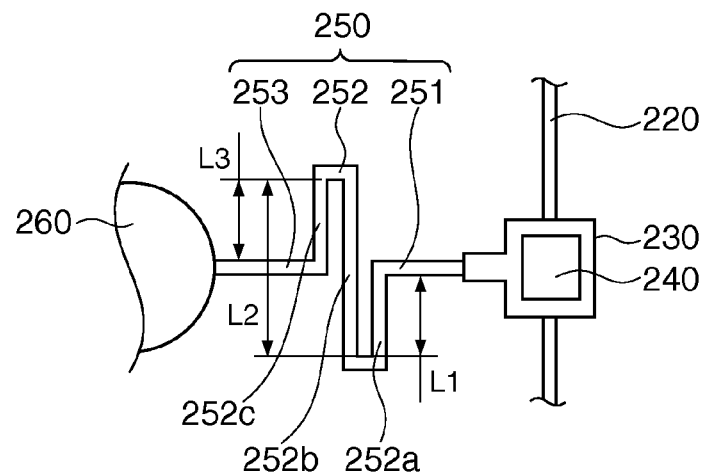
FIGS. 3A and 3B are partial explanatory diagrams of a movable beam according to the first embodiment.
Figure 3B:
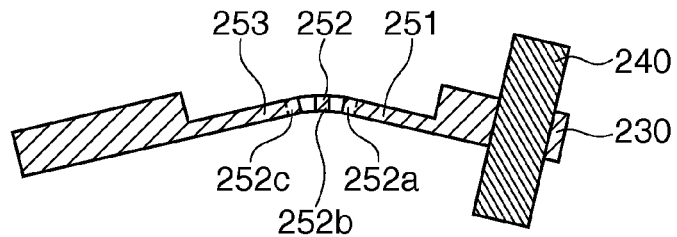

As shown in FIG. 3A showing an enlarged portion including the movable beam 250, the bending section 252 is disposed between the displacement section's-side movable beam 251 and the movable section's-side movable beam 253 and includes bending beams 252a, 252b, and 252c which are perpendicular to a direction in which the displacement section's-side movable beam 251 and the movable section's-side movable beam 253 extend. By forming the bending section 252 in this way, when the movable beam 250 bends as shown in FIG. 3B, the deformation thereof is converted into torsional deformation of the bending beams 252a, 252b, and 252c, and the bending section 252 alone bears the displacement of the movable beam 250.

In the torsional deformation caused when the moment is applied to the ends of the beam, the longer the beam is, the greater the torsional angle of the beam for the same moment becomes. In other words, the longer the beam is, the smaller the moment which is applied to obtain the same torsional angle can be made. In this embodiment, an area which converts the displacement (deformation) of the movable beam 250 into torsional deformation corresponds to the bending beams 252a, 252b, and 252c, and applying the moment to the bending beams 252a, 252b, and 252c equates to applying the torsional moment to a beam having a length equal to the sum of the lengths L1, L2, and L3 of the bending beams 252a, 252b, and 252c. This makes it possible to cause torsional deformation in the bending section 252 easily. In this way, a structure is adopted in which the displacement (deformation) of the movable beam 250 connecting the displacement section 230 and the movable section 260 is absorbed by the bending section 252 alone so that the displacement section's-side movable beam 251 and the movable section's-side movable beam 253 are not deformed.

The bending section 252 is deformed as described above, and, as shown in FIG. 2B, the movable section's-side movable beams 253 move following the displacement of the bending sections 252 in the p1 and q1 directions, whereby the movable section's-side movable beams 253 and the movable section 260 connected to the movable section's-side movable beams 253 tilt with respect to a state shown in FIG. 2A in which the optical scanner 100 does not operate. Therefore, the light reflecting member 280 fixed to the movable section 260 via the supporting member 270 also tilts.

By passing a current in the reverse direction to that in the operation described above by using FIG. 2B through the coils 420 of the coil sections 400, that is, by reversing the direction of the magnetic fields of the coil sections 400, displacements P2, Q2, p2, and q2 in the reverse directions to the displacements shown in FIG. 2B described above are generated as shown in FIG. 2C.

The above-described operations are controlled by the direction and intensity of the currents which are passed through the coils 420 of the coil sections 400, thereby controlling the direction, amount, and speed of the tilt of the light reflecting member 280. Furthermore, by adding the movable beam 250 connected to the pair of displacement sections 230 formed along the Y axis and individually controlling the currents which are passed through the coils 420 provided in the coil sections 400 provided in four places, it is possible to drive the movable section 260 and the light reflecting member 280 fixed to the movable section 260 via the supporting member 270 three-dimensionally.

Figure 4:
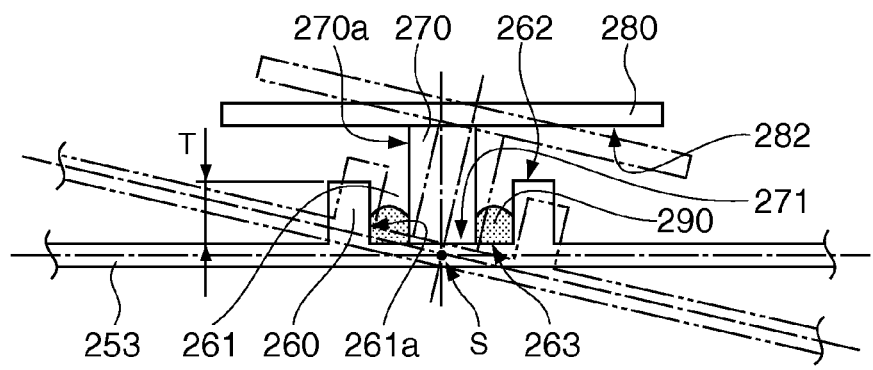
FIG. 4 is a partial sectional view explaining the operation of a movable section and a light reflecting member of the optical scanner according to the first embodiment.

The operation of the light reflecting member 280 will be described. As described above, the light reflecting member 280 is fixed to the movable section 260 via the supporting member 270. Therefore, the light reflecting member 280 operates in the same manner as the movable section 260. However, as in an enlarged sectional view shown in FIG. 4 including the light reflecting member 280, the supporting member 270, and the movable section 260, it is preferable to dispose the light reflecting member 280 ideally in such a way as to coincide with a center of movement S of the movable section 260 to the utmost extent. However, from the standpoint of, for example, the strength of the vibrating substrate 200 and minimization of deformation of the movable section 260, the movable section 260 has to have a predetermined thickness T.

The concave section 261 is provided in the movable section 260 having the thickness T, and an end 271 of the supporting member 270 opposite to the side which is fixed to the light reflecting member 280, is placed in the concave section 261 and fixed with the adhesive 290. With this structure, it is possible to minimize the space between a nonreflective surface 282 of the light reflecting member 280 and an end face 262 of the movable section 260 and dispose the light reflecting member 280 to be closer to the center of movement S of the movable section 260. This makes it possible to obtain a small optical scanner 100.

Moreover, the space formed by an inner circumferential surface 261a of the concave section 261 of the movable section 260 and an outer surface 270a of the supporting member 270 can serve as a pool for an excess part of the adhesive 290 which is applied excessively to bond the supporting member 270 and the movable section 260 together more securely. As a result, the excess part of the adhesive 290 is prevented from leaking out into the space between the nonreflective surface 282 of the light reflecting member 280 and the end face 262 of the movable section 260, and the adhesive 290 does not leak into the movable section's-side movable beam 253, whereby it is possible to suppress the influence on the operation balance of the movable section 260.

Furthermore, the excess part of the adhesive 290 in the space formed by the inner circumferential surface 261a of the concave section 261 of the movable section 260 and the outer surface 270a of the supporting member 270 bonds the inner circumferential surface 261a of the concave section 261 of the movable section 260 and the outer surface 270a of the supporting member 270 together. This makes it possible to improve the fixing strength of the movable section 260 to the supporting member 270.

Figure 5A:
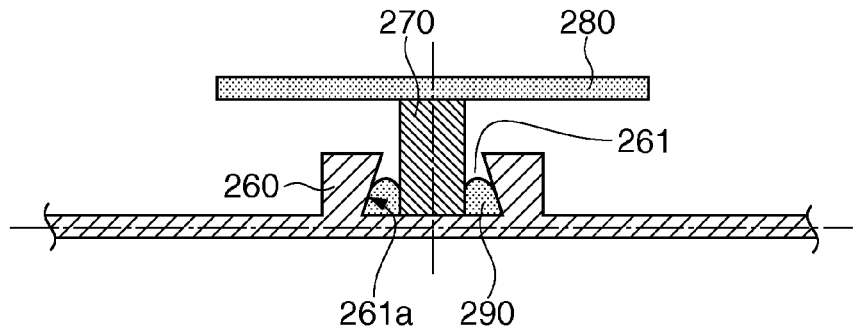
FIGS. 5A and 5B are partial sectional views each showing another example of the shape of a fixing part of the movable section and a supporting member of the optical scanner according to the first embodiment.
Figure 5B:
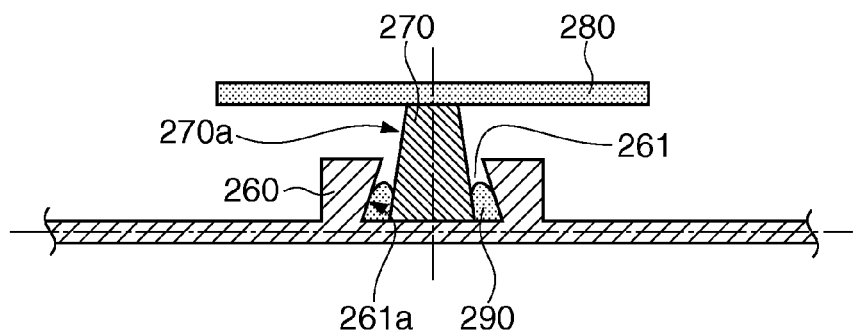

Moreover, the form of the concave section 261 of the movable section 260 and the form of the supporting member 270 which are shown in FIGS. 5A and 5B can also be adopted. The movable section 260 shown in FIG. 5A has the inner circumferential surface 261a forming the concave section 261 toward the opening of the concave section 261 as a so-called inversely tapered surface such that the inner circumferential surface 261a is formed as part of a conical surface and the cross-sectional area of the concave section 261 continuously decreases from the bottom face of the concave section 261 toward the opening.

By forming the concave section 261 provided with the inner circumferential surface 261a formed as an inversely tapered surface shown in FIG. 5A, after the excess adhesive 290 hardens, the anchor effect on the inner circumferential surface 261a of the concave section 261 is exhibited. This makes it possible to further increase the bonding strength between the supporting member 270 and the movable section 260. Furthermore, by filling the space formed by the concave section 261 and the supporting member 270 with the adhesive 290, it is possible to further increase the bonding strength between the supporting member 270 and the movable section 260. The concave section 261 having an inversely tapered shape can be formed by performing etching at the time of formation of the concave section 261.

The movable section 260 shown in FIG. 5B is the same as the concave section 261 having an inversely tapered surface shown in FIG. 5A described above. In addition, the supporting member 270 is formed into a so-called conical column by making the diameter of an end of the supporting member 270, which is placed in the concave section 261 of the movable section 260, greater than the diameter of an end of the supporting member 270, which is fixed to the light reflecting member 280. By doing so, the excess adhesive 290 in the space formed by the inner circumferential surface 261a of the concave section 261 of the movable section 260 and the outer surface 270a of the supporting member 270 functions as a strong anchor member between the movable section 260 and the supporting member 270, making it possible to still further increase the fixing strength of the supporting member 270 to the movable section 260. Furthermore, by filling the space formed by the concave section 261 and the supporting member 270 with the adhesive 290, it is possible to further increase the bonding strength between the supporting member 270 and the movable section 260.

Second Embodiment

Figure 6:
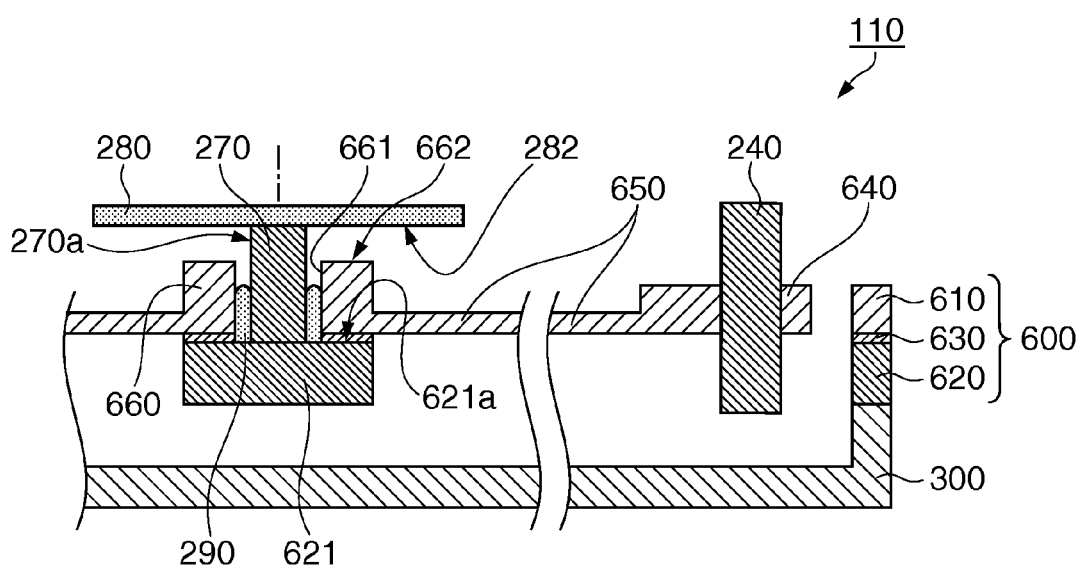
FIG. 6 is a sectional view showing the outline of an optical scanner according to a second embodiment.

Moreover, by using a two-layered vibrating substrate 600 of a second embodiment shown in FIG. 6, it is possible to implement the invention easily. FIG. 6 is a sectional view showing the outline of an optical scanner 110 according to the second embodiment, in which the vibrating substrate 200 of the optical scanner 100 according to the first embodiment described above is replaced with a two-layer structure formed of a first vibrating substrate 610 and a second vibrating substrate 620. Both the first vibrating substrate 610 and the second vibrating substrate 620 are formed of a silicon substrate and bonded together by a silicon oxide film 630 to form a two-layer structure. Incidentally, the planar shape of the optical scanner 110 is the same as that of the optical scanner 100 according to the first embodiment described above.

The first vibrating substrate 610 includes a displacement section 640 provided with a bar-like permanent magnet 240, a movable beam 650 which extends from the displacement section 640 and is provided with an unillustrated bending section at the center thereof, and a movable section 660 which is connected to the movable beam 650 and is provided in the central part of the optical scanner 110 as seen in a plan view. As is the case with the first embodiment, a pair of sets of the displacement section 640 and the movable beam 650 is disposed so that one set faces the other with the movable section 660 located at the center, and two pairs of sets of the displacement section 640 and the movable beam 650 are provided so that the two pairs are at right angles to each other as seen in a plan view.

The second vibrating substrate 620 includes an unillustrated supporting frame and a movable section supporting member 621 which overlaps the movable section 660 of the first vibrating substrate 610 as seen in a plan view. In the center of the movable section 660 of the first vibrating substrate 610, a through-hole 661 including the silicon oxide film which is a bonding layer is formed, and part of a bonded surface 621a of the movable section supporting member 621 of the second vibrating substrate 620 is exposed. An end 271 of the supporting member 270 fixed to the light reflecting member 280 on the other side where the supporting member 270 is fixed to the light reflecting member 280, is placed in a concave section formed of the through-hole 661 and the movable section supporting member 621, and the end 271 and part of the bonded surface 621a of the movable section supporting member 621, which is exposed at the surface of the through-hole 661, are fixed by being bonded with the adhesive 290. At the same time, the excess part of the adhesive 290 in the space formed by an inner circumferential surface of the through-hole 661 and an outer circumferential surface 270a of the supporting member 270 further strengthens the bonding between them, whereby the light reflecting member 280 is securely fixed to the movable section 660 by being bonded thereto via the supporting member 270.

According to the configuration of the fixing of the light reflecting member 280 described in the second embodiment, it is possible to realize further minimization of the space between a nonreflective surface 282 of the light reflecting member 280 and an end face 662 of the movable section 660 and dispose the light reflecting member 280 in such a way as to be closer to the center of movement of the movable section 660 of the first vibrating substrate 610. This makes it possible to obtain a small optical scanner 110.

Third Embodiment

An image forming apparatus using the optical scanner 100 according to the first embodiment described above and the optical scanner 110 according to the second embodiment described above will be described. In this embodiment, a projector is illustrated as an example; however, the invention can also be suitably applied to an image forming apparatus such as a laser printer, an imaging display, a bar code reader, and a confocal scanning microscope.

Figure 7:
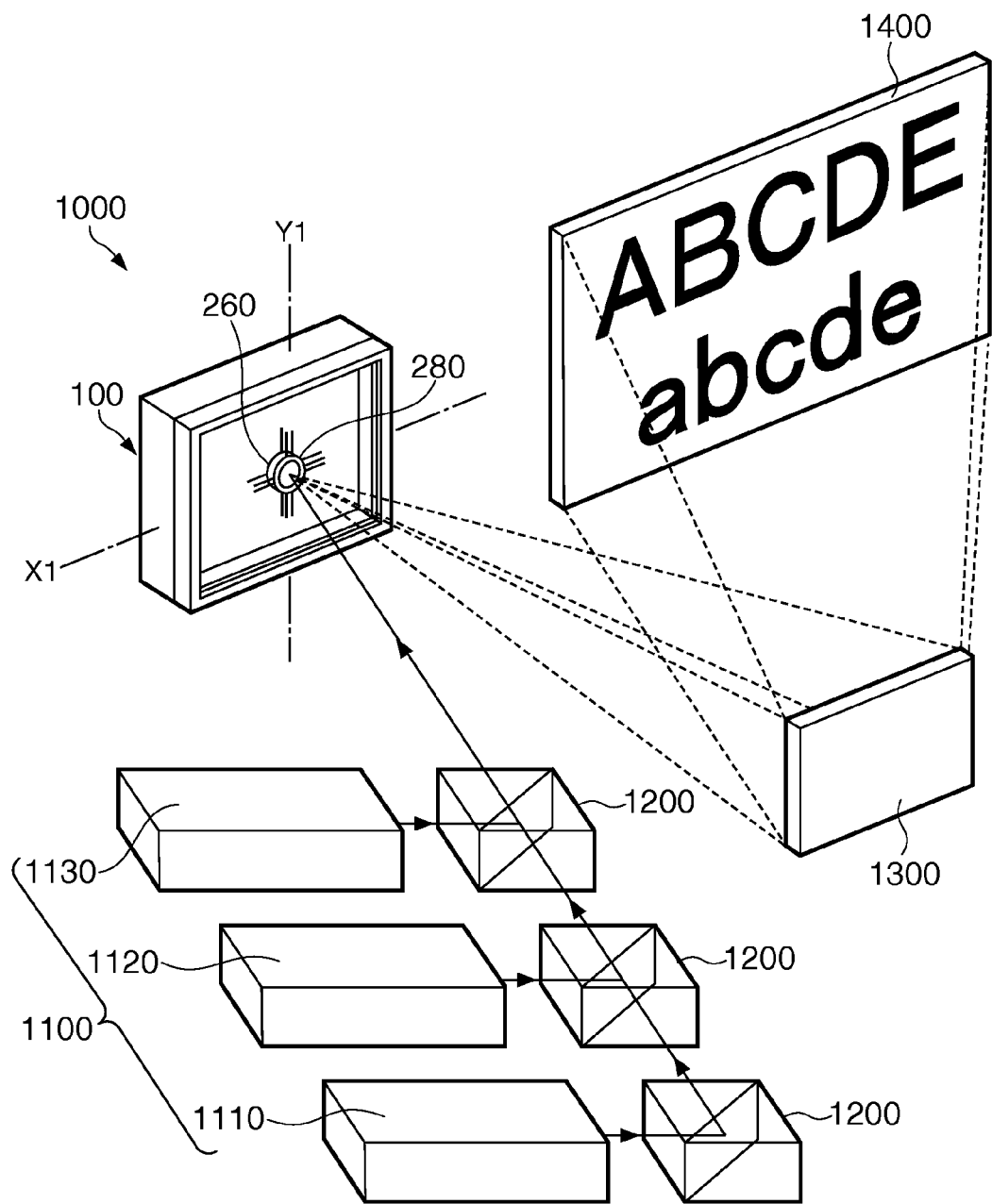
FIG. 7 is a configuration diagram showing the outline of an image forming apparatus according to a third embodiment.

FIG. 7 is a conceptual diagram of a projector 1000 using the optical scanner 100 according to the embodiment described above. Incidentally, for convenience of explanation, a longitudinal direction of a screen 1400 is referred to as a "lateral direction" and a direction perpendicular to the longitudinal direction is referred to as a "vertical direction".

The projector 1000 has a light source device 1100 emitting a light such as a laser, a plurality of dichroic mirrors 1200, and the optical scanner 100. The light source device 1100 includes a red light source device 1110 emitting a red light, a blue light source device 1120 emitting a blue light, and a green light source device 1130 emitting a green light. The dichroic mirrors 1200 are optical elements which combine the lights emitted from the red light source device 1110, the blue light source device 1120, and the green light source device 1130.

Such a projector 1000 is so configured that the lights emitted from the light source device 1100 (the red light source device 1110, the blue light source device 1120, and the green light source device 1130) are combined by the dichroic mirrors 1200 based on image information from an unillustrated host computer, the light thus obtained is two-dimensionally scanned by the optical scanner 100, and a color image is formed on the screen 1400.

At the time of two-dimensional scanning, the light reflected by the light reflecting member 280 is scanned in the lateral direction of the screen 1400 (main scanning) by the turning of the movable section 260 of the optical scanner 100 about a rotation center axis Y1. On the other hand, the light reflected by the light reflecting member 280 is scanned in the vertical direction of the screen 1400 (sub-scanning) by the turning of the movable section 260 of the optical scanner 100 about a rotation center axis X1.

Scanning of light by the optical scanner 100 may be performed by raster scanning described above or by vector scanning. Since the optical scanner 100 is particularly suitable for vector scanning because of the structure thereof, it is preferable to scan light by vector scanning. The vector scanning is a method by which the light emitted from the light source device 1100 is scanned on the screen 1400 in such a way as to form line segments sequentially, each of which connects two different points on the screen 1400. That is, the vector scanning is a method by which an intended image is formed on the screen 1400 by gathering minute straight lines. As described earlier, since the movable section 260 can be displaced irregularly and continuously in the optical scanner 100, the optical scanner 100 is particularly suitable for such vector scanning.

Figure 8:
FIG. 8 is a diagram showing an example of drawing performed using the image forming apparatus according to the third embodiment.

Specifically, when a group of letters shown in FIG. 8 is drawn by vector scanning, the light emitted from the light source device 1100 is scanned in such a way as to write each letter. At this time, by controlling the position (turning) of the movable section 260 of the optical scanner 100 about the rotation center axis X1 and the position (turning) thereof about the rotation center axis Y1, it is possible to scan the light irregularly and draw the letters shown in FIG. 8 as if the letters are written without lifting a pencil from the paper. With such vector scanning, unlike raster scanning, it is not necessary to scan the light on the entire surface of the screen 1400. This makes it possible to draw an image efficiently.

Incidentally, in FIG. 7, after the light combined by the dichroic mirrors 1200 is two-dimensionally scanned by the optical scanner 100, the light is reflected by a stationary mirror 1300, and an image is formed on the screen 1400. However, the stationary mirror 1300 may be omitted, and the light which has been two-dimensionally scanned by the optical scanner 100 may be directly shone onto the screen 1400.

Although the optical scanner and the image forming apparatus according to the invention have been described by way of embodiments shown in the drawings, the invention is not limited thereto. For example, in the optical scanner and the image forming apparatus according to the invention, the structure of each section can be replaced with any structure with a similar function, and any component can be added. Moreover, for example, in the optical scanner according to the invention, the embodiments described above can be combined appropriately.

Moreover, in the embodiments described above, as a structure of the driving device, a structure which adopts electromagnetic driving using a permanent magnet and an electromagnetic coil has been described. However, the structure is not limited to the above structure as long as the movable section can be displaced in the manner described above. For example, as a displacement unit, electrostatic driving or piezoelectric driving may be adopted. Furthermore, in the embodiments described above, a structure having a bending section alleviating stress in the middle of each movable beam has been described. However, the structure is not limited to the above structure, and the bending section may be omitted. That is, in each movable beam, the movable section's-side movable beam and the displacement section's-side movable beam may be directly connected.

In addition, in the embodiments described above, a structure in which the displacement section's-side movable beam of each movable beam is not substantially deformed when the optical scanner is driven has been described. However, the structure is not limited to the above structure. For example, the displacement section's-side movable beam of each movable beam may be bent and deformed (curved and deformed) in the Z-axis direction.

The entire disclosure of Japanese Patent Application No. 2010-176004, filed Aug. 5, 2010 is expressly incorporated by reference herein.

What is claimed is:

1. An optical scanner comprising:
a light reflecting section having a light reflecting surface;
a supporting section supporting the light reflecting section;
a movable section that supports the supporting section and can turn about a rotation center axis;
at least a pair of movable beams extending from the movable section and disposed in such a way that the movable beams face each other with the movable section interposed therebetween;
a displacement section connected to one of the movable beams on a side opposite from the movable section;
a driving section for driving the displacement section;
two drive beams each extending from the displacement section in a direction along the light reflecting surface and perpendicular to a direction in which the movable beam extends; and
a supporting frame for supporting the drive beams,
wherein the movable beams each include a bending section which is bent and deformed in a thickness direction of the supporting frame by displacement of the displacement section,
an end of the supporting section located proximate the movable section is fixed at a position more distant from the light reflecting section than an end face of the movable section that faces the light reflecting section,
the supporting section is fixed to a bottom face portion of a concave section of the movable section by being bonded thereto,
the displacement section includes a permanent magnet having, along a direction perpendicular to the light reflecting surface, a north pole disposed on a side where one surface of the displacement section is located and a south pole disposed on a side where another surface of the displacement section is located,
the displacement section has a through-hole, and the permanent magnet is inserted into the through-hole, and
the driving section includes a coil disposed so as to generate a magnetic field in a direction perpendicular to a polarity of the permanent magnet.

2. The optical scanner according to claim 1, wherein the supporting section and the movable section are fabricated separately.

3. The optical scanner according to claim 1, wherein an area of the light reflecting section in a plan view from a perpendicular direction to the reflecting surface is larger than that of the movable section.

4. The optical scanner according to claim 1, wherein an area of the bottom face portion of the concave section is greater than an area of an opening of the concave section.

5. The optical scanner according to claim 4, wherein an area of a bonded section in which the supporting section is bonded to the light reflecting section is smaller than an area of a bonded section in which the supporting section is bonded to the movable section.

6. The optical scanner according to claim 1, wherein a space formed by a concave section and the supporting section includes an adhesive, the concave section provided in the movable section, and
an end of the adhesive on the side of an opening of the concave section is located in the space.

7. An image forming apparatus comprising:
a light source; and
an optical scanner scanning a light from the light source, wherein the optical scanner includes:
a light reflecting section having a light reflecting surface,
a supporting section supporting the light reflecting section,
a movable section that supports the supporting section and can turn about a rotation center axis,
at least a pair of movable beams extending from the movable section and disposed in such a way that the movable beams face each other with the movable section interposed therebetween,
a displacement section connected to one of the movable beams on the side opposite from the movable section,
a driving section driving the displacement section,
two drive beams each extending from the displacement section in a direction along the light reflecting surface and perpendicular to a direction in which one of the movable beams extends, and
a supporting frame supporting the drive beams, wherein the movable beams each include a bending section which is bent and deformed in a thickness direction of the supporting frame by displacement of the displacement section, an end of the supporting section located proximate the movable section is fixed at a position more distant from the light reflecting section than an end face of the movable section that faces the light reflecting section, the supporting section is fixed to a bottom face portion of a concave section of the movable section by being bonded thereto, the displacement section includes a permanent magnet having, along a direction perpendicular to the light reflecting surface, a north pole disposed on a side where one surface of the displacement section is located and a south pole disposed on a side where another surface of the displacement section is located, the displacement section has a through-hole, and the permanent magnet is inserted into the through-hole, and the driving section includes a coil disposed so as to generate a magnetic field in a direction perpendicular to a polarity of the permanent magnet.

\* \* \* \* \*